Patented Apr. 1, 1924.

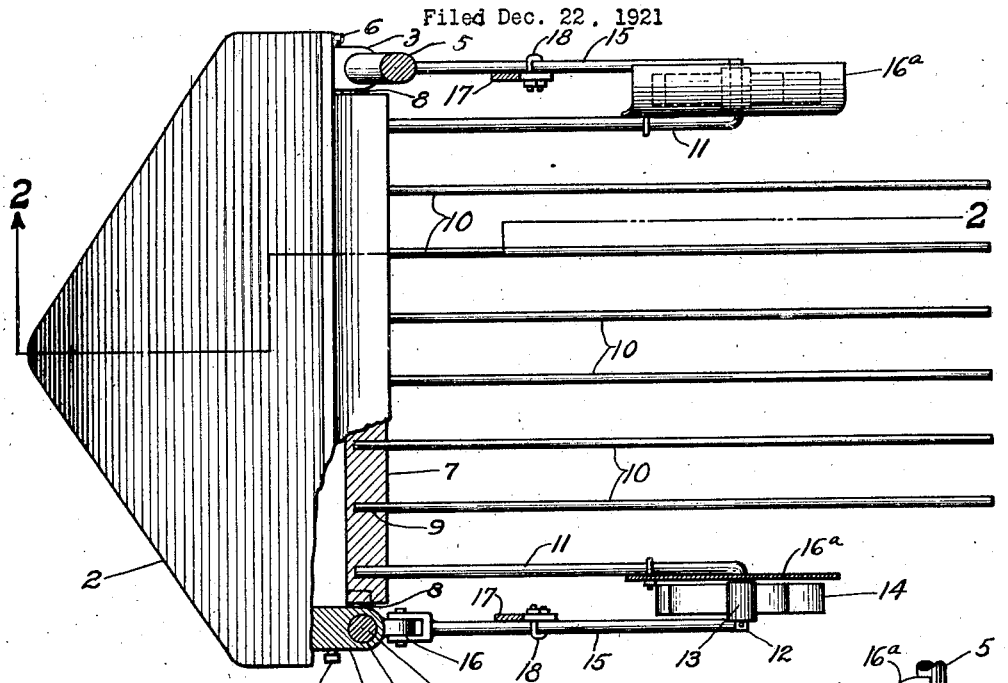

1,488,724

UNITED STATES PATENT OFFICE.

WILLIAM A. WILSON, OF MINNEAPOLIS, MINNESOTA.

POTATO DIGGER.

Application filed December 22, 1921. Serial No. 524,160.

*To all whom it may concern:*

Be it known that I, WILLIAM A. WILSON, a citizen of the United States, resident of Minneapolis, county of Hennepin, State of Minnesota, have invented certain new and useful Improvements in Potato Diggers, of which the following is a specification.

The object of my invention is to provide an improved potato digging shovel and shaker by means of which the potatoes as they are dug out of the soil by the point of the shovel will be thorougly agitated and separated from soil or other material which may be clinging thereto.

A further object is to provide a shaking device which will operate smoothly and evenly in the rear of the shovel and thoroughly agitate the potatoes guided thereon.

A further and particular object is to provide a potato digging shovel in which the passage over the group of agitating tines will be wholly unobstructed and all danger of weeds, grass or vines lodging thereon will be eliminated.

In the accompanying drawings forming part of this specification,

Figure 1 is a plan view of the implement with a portion of the shovel broken away, showing the connection of the agitating device therewith, Figure 2 is a sectional view on the line 2—2 of Figure 1, Figure 3 is a sectional view on the line 3—3 of Figure 2.

In the drawing, 2 represents the potato digging shovel having preferably a tapered forward portion or nose with comparatively thin edges to dig easily into the soil and mounted by suitable means on blocks 3 which have sockets 4 therein to receive hangers 5 which depend from the supporting wheeled frame above. This frame I have not illustrated except in detail in Figure 2 herein, as it forms no part of my present invention.

The hangers are adjustably secured in the sockets 4 by suitable means, such as set screws 6. Between the blocks 3 I arrange a bar 7 pivotally supported on said blocks at 8 and having a series of sockets 9 therein to receive the agitating fingers or tines 10 which project rearwardly from the bar in parallel relation and spaced a suitable distance apart.

At each end of the bar 7 I provide a rod 11 in parallel relation with the agitating tines and offset at its middle portion so that the rear of the rod is above the normal level of the bar 7. Outwardly turned ends 12 are provided at the rear ends of the rods 11 having rollers 13 thereon which are adapted to ride upon the peripheries of toothed wheels 14 arranged on each side of the group of agitating tines. Draft rods 15 have bearings at their rear ends whereon said wheels 14 are mounted and the forward ends of said draft rods are pivotally connected at 16 with the rear portions of the blocks 3, and are free to oscillate vertically thereon. The wheels 14, as indicated in Figure 3, rest on the side inclined portions of the furrow that is cut in the soil by the shovel and serve to support the agitating tines a suitable distance above the bottom of the furrow. I prefer to provide guards $16^a$ on the rods 11 having outwardly curved upper portions to overhang the toothed wheels and prevent grass, potato stalks, and other refuse material from catching or lodging on the wheels. The arrangement of the tine-supporting wheels on each side of the furrow provides, as indicated in Figure 1, a clear, unobstructed passage over the tines to the rear portion of the agitator and thereby I not only provide increased capacity for the implement, but I also add to its efficiency by eliminating all danger of rubbish or refuse catching or lodging on the tines, which frequently does happen when the supporting wheel is mounted midway of the tines.

For the purpose of adjusting the rods 15 I prefer to provide adjusting links 17 movable on the rods 15 by means of clamps 18 and pivotally connected at their opposite ends with braces 19 which are mounted on the frame 20 of the machine. Evidently, by loosening the clamps 18 and adjusting the links back and forth thereon, the rods 15 may be raised or lowered and the relative position of the wheels 14 and the point of the shovel changed as may be desired. This device may be used in connection with any suitable wheel frame, but I prefer to remove the ground-working implements from a suitable riding cultivator frame and attach the hangers 5 in a suitable manner thereto.

I claim as my invention:

1. A potato digger comprising a shovel, a series of tines mounted for vertical oscillation in the rear thereof, toothed wheels arranged upon each side of said group of tines and connected with said shovel, rods having rear portions to ride on the peripheries of said wheels and connected with said tines to oscillate them, and means for adjusting said toothed wheels vertically.

2. A potato digger comprising a shovel, a series of tines mounted for vertical oscillation in the rear thereof, a rod pivotally connected with said shovel for vertical oscillation, a toothed wheel mounted on said rod, means connected with said tines and bearing on said teeth for oscillating said tines vertically when said wheel revolves, and a link connected with said rod for adjusting it vertically.

3. A potato digger comprising a shovel, a series of tines mounted for vertical oscillation in the rear thereof, a toothed wheel arranged at the side of said group of tines and connected with said shovel, a rod connected with said tines and mounted to ride on said wheel for oscillating said tines.

4. A potato digger comprising a shovel, a series of tines mounted for vertical oscillation in the rear thereof, toothed wheels arranged upon each side of said group of tines and connected with said shovel, rods having rear portions to ride on the peripheries of said wheels and connected with said tines to oscillate them, and guards mounted on said rods and overhanging said wheels.

5. A potato digger comprising a shovel, blocks mounted on the rear portion thereof, a cross bar pivotally supported in said blocks, a series of tines mounted in said cross bar and projecting rearwardly therefrom, toothed wheels having a pivotal connection with said blocks, and rods mounted in said cross bar and having bearings on the peripheries of said wheels to be actuated vertically by the revolution of said wheels.

6. A potato digger comprising a shovel, a cross bar pivotally supported in the rear thereof, a series of tines mounted in said cross bar and projecting readwardly therefrom, rods pivotally connected at their forward ends with said shovel for vertical oscillation, toothed wheels mounted on the rear portions of said rods upon opposite sides of said tines, means mounted on said cross bar and having a bearing on the teeth of said wheels to be oscillated vertically thereby to agitate said tines, and links pivotally supported at their upper ends and having means for adjustment on said draft rods for raising and lowering said wheels.

7. A potato digger comprising a shovel, a cross-bar pivotally supported in the rear thereof, a series of tines mounted in said cross-bar and projecting rearwardly therefrom, a rod pivotally connected with said shovel for vertical oscillation, a toothed wheel mounted on said rod, means mounted on said cross-bar and having a bearing on said wheel to be oscillated vertically thereby to agitate said tines.

8. A potato digger comprising a shovel, a cross-bar pivotally supported in the rear thereof, a series of tines mounted in said cross-bar and projecting rearwardly therefrom, a rod pivotally connected with said shovel for vertical oscillation, a toothed wheel mounted on said rod, means mounted on said cross-bar and having a bearing on said wheel to be oscillated vertically thereby to agitate said tines, and a link pivotally supported at its upper end and having means for adjustment on said rod for raising and lowering said wheel.

In witness whereof, I have hereunto set my hand this 19th day of December 1921.

WILLIAM A. WILSON.